(12) United States Patent
Yu et al.

(10) Patent No.: US 11,018,716 B2
(45) Date of Patent: May 25, 2021

(54) MULTI-FREQUENCY PROCESSING DEVICE OF TIRE PRESSURE DETECTOR AND PROCESSING METHOD THEREOF

(71) Applicant: CUB ELECPARTS INC., Changhua County (TW)

(72) Inventors: San-Chuan Yu, Changhua County (TW); Yuan-Tung Hung, Changhua County (TW); Tzu-Wen Ko, Changhua County (TW); Chi-Hung Chen, Changhua County (TW); Wei-Shun Shih, Changhua County (TW)

(73) Assignee: Cub Elecparts Inc., Changhua County (TW)

( * ) Notice: Subject to any disclaimer, the term of this patent is extended or adjusted under 35 U.S.C. 154(b) by 0 days.

(21) Appl. No.: 16/786,005

(22) Filed: Feb. 10, 2020

(65) Prior Publication Data

US 2021/0067195 A1 Mar. 4, 2021

(30) Foreign Application Priority Data

Aug. 30, 2019 (TW) .................................. 108131372

(51) Int. Cl.
*H04B 1/715* (2011.01)
(52) U.S. Cl.
CPC ..... *H04B 1/715* (2013.01); *H04B 2001/7154* (2013.01); *H04B 2201/71346* (2013.01)

(58) Field of Classification Search
CPC .......... H04B 1/715; H04B 2201/71346; H04B 2201/7154
USPC .......................... 375/135, 294, 295, 373, 376
See application file for complete search history.

(56) References Cited

U.S. PATENT DOCUMENTS

| | | | |
|---|---|---|---|
| 2002/0019217 A1* | 2/2002 | Wasko | H04B 1/0483 455/103 |
| 2014/0306815 A1* | 10/2014 | Henriet | B60C 23/0471 340/447 |
| 2018/0094996 A1* | 4/2018 | Yu | B60C 23/0452 |

* cited by examiner

*Primary Examiner* — Ted M Wang
(74) *Attorney, Agent, or Firm* — Muncy. Geissler, Olds & Lowe, P.C.

(57) ABSTRACT

A multi-frequency processing device of a tire pressure detector and processing method thereof are provided. The device includes an oscillator providing an oscillation signal as a basis frequency; a microcontroller storing a first and a second frequency information; a phase lock module receiving the oscillation signal and generating a first and a second target frequency according to the first frequency information and the second frequency information; and a transmission module receiving a data from the microcontroller in a first mode, and generating a signal frame formed of the first and second target frequency carrying the data, so as to transmit the signal frame. Therefore, the transmission frequency does not have to be set in advance, improving the convenience of usage.

14 Claims, 6 Drawing Sheets

MULTI-FREQUENCY PROCESSING DEVICE OF TIRE PRESSURE DETECTOR AND PROCESSING METHOD THEREOF

BACKGROUND OF THE INVENTION

1. Field of the Invention

The present invention relates to tire pressure detectors, and more particularly, to a multi-frequency processing device of tire pressure detector and processing method thereof.

2. Description of the Related Art

The transmission frequency of current tire pressure detectors is mainly categorized in the European 433 MHz standard and the U.S. 315 MHz standard. While the same vehicle model will be simultaneously sold to different countries, based on the regulations of each region (country), the host machine will be configured to receive signals having corresponding transmission frequencies from different tire pressure detectors.

Also, when the tire pressure detector is malfunctioned and needed to be replaced, if the transmission frequency of which the host machine installed on the vehicle receives is unknown (such as for a second-hand vehicle), it is impossible to install a tire pressure detector having the transmission frequency corresponding to the frequency received by the host machine, causing the difficulty for installation of tire pressure detector.

For improve such issue, relevant prior arts provide a communication module which is able to send out two transmission frequencies in a single tire pressure detector. Therefore, the manufacturer of the tire pressure detector does not need to respectively manufacture tire pressure detectors for different transmission frequencies, and the user is allowed to set the transmission frequency of the tire pressure detectors according to the transmission frequency of the host machine, by which the tire pressure detector is configured to send out a specific transmission frequency. However, the circuit hardware for application of other transmission channels are no longer applied. Therefore, the flexibility of the application of a dual-frequency detector still has to be improved.

Nevertheless, in such case above, if the transmission frequency of the host machine of the vehicle is not acquired in the first place, a trial operation has to be undertaken for confirming the transmission frequency of the host machine first, and the transmission frequency of the tire pressure detector is then set up, so as to facilitate the installation of the tire pressure detector on the tire, still failing to meet the convenience of usage.

SUMMARY OF THE INVENTION

For improving the issues above, a multi-frequency processing device of tire pressure detector and processing method thereof are disclosed. By transmission of the signal frame formed of a first target frequency and second target frequency that carry the data, the setting process of the transmission frequency is saved, so as to facilitate the installation of the tire pressure detector.

For achieving the aforementioned objectives, a multi-frequency processing device of a tire pressure detector is provided, comprising:

an oscillator configured to provide an oscillation signal which is applied as a basis frequency;

a microcontroller electrically connected with the oscillator, the microcontroller storing a first frequency information and a second frequency information;

a phase lock module electrically connected with the oscillator and the microcontroller, the phase lock module being configured to receive the oscillation signal, and generate a first target frequency and a second target frequency according to the first frequency information and the second frequency information; and a transmission module electrically connected with the microcontroller and the phase lock module, the microcontroller being configured to provide a data to the transmission module in a first mode, generate a signal frame which is formed of the first target frequency and second target frequency that carry the data, and transmit the signal frame.

In an embodiment of the present invention, the transmission module is configured to send the signal frame which comprises the data to a terminal device, so that the terminal device, after reading the signal frame, sends out a match information. The microcontroller is configured to, in a second mode, receive the match information sent by the transmission module, so as to determine, according to the match information, if the receiving frequency of the terminal device is the first target frequency or the second target frequency.

In an embodiment of the present invention, a processing method of a tire pressure detector, comprising following steps:

an oscillator providing an oscillation signal which is applied as a basis frequency by a phase lock module;

the phase lock module receiving the oscillation signal, and generating a first target frequency and a second target frequency according to a first frequency information and a second frequency information provided by a microcontroller;

the phase lock module sending the first target frequency and the second target frequency to a transmission module; and the microcontroller, in a first mode, providing a data to the transmission module; the transmission module generating a signal frame which is formed of the first target frequency and the second target frequency that carry the data, and transmitting the signal frame outward.

With such configuration, the signal frame formed of the first target frequency and the second target frequency that carry the data is transmitted outward, the transmission frequency of the tire pressure detector does not need to be set according to the receiving frequency of the terminal device in the first place, saving the necessity of confirming the receiving frequency of the terminal device before setting the transmission frequency of the tire pressure detector, and improving the installation convenience of the tire pressure detector.

Also, according to the match information sent out by the terminal device after reading the signal frame, the microcontroller determines one of the first and second target frequencies as the receiving frequency of the terminal device, and the data transmission is carried out according to the receiving frequency of the terminal device. Therefore, it is unnecessary to set the transmission frequency according to the receiving frequency of the terminal device, saving the operation of setting the target frequency of the tire pressure detector, and meeting the installation convenience of the tire pressure detector.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion, size, variation or displacement for explanation but not subject to the actual proportion.

Figure 1:
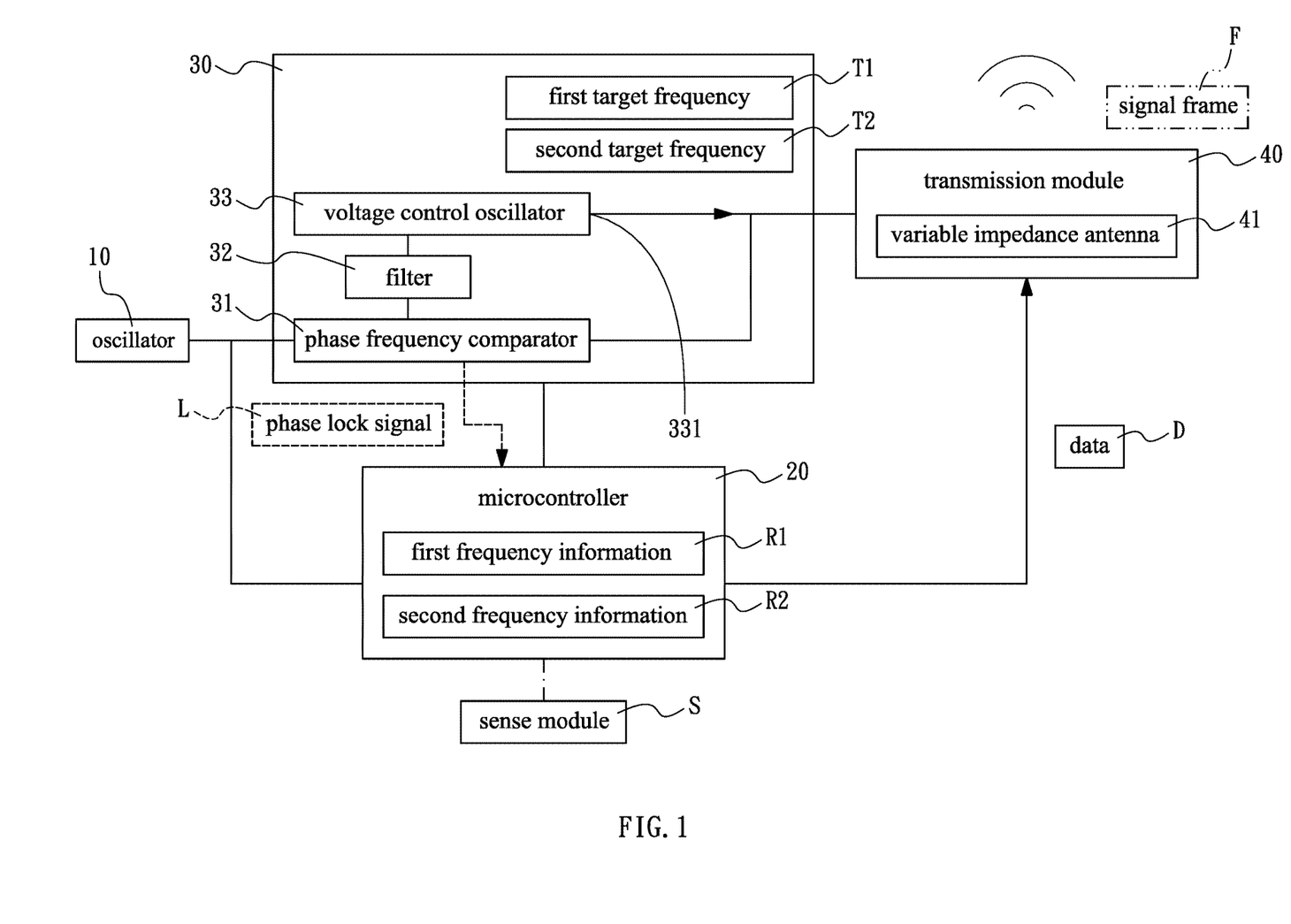
FIG. 1 is a block diagram of a multi-frequency processing device in accordance with the first embodiment of the present invention, illustrating the microcontroller in a first mode.
Figure 2:
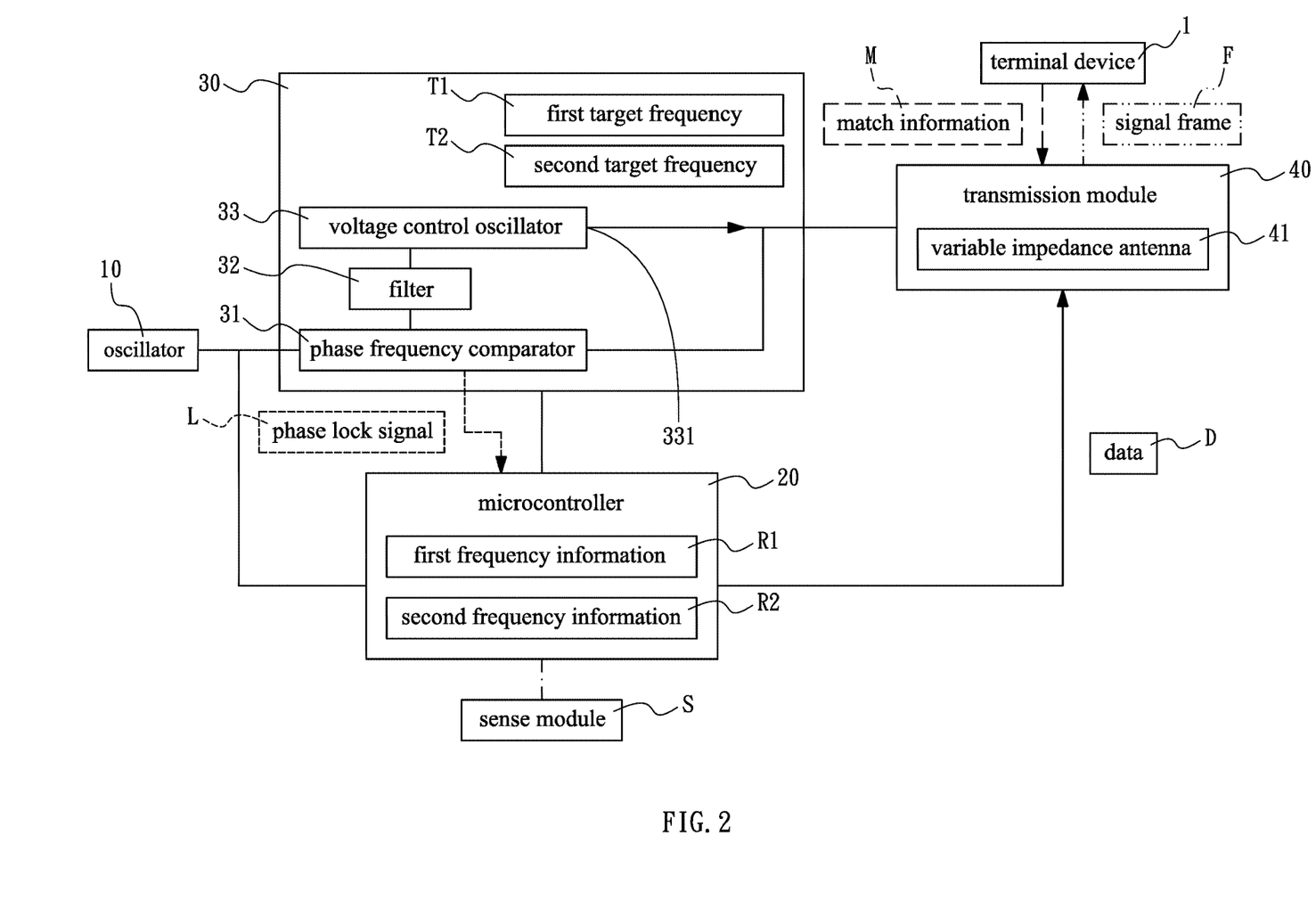
FIG. 2 is a block diagram of the multi-frequency processing device in accordance with the first embodiment of the present invention, illustrating the microcontroller in a second mode.
Figure 3:
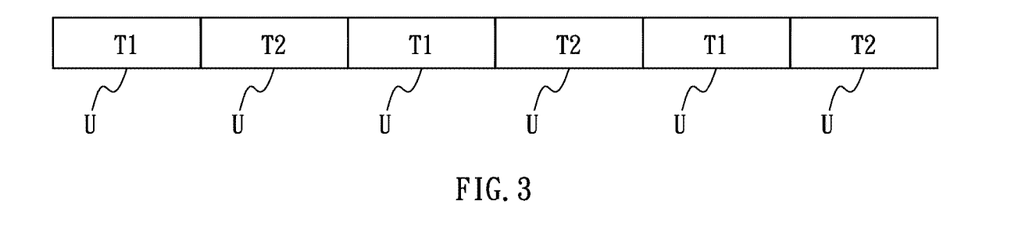
FIG. 3 is a schematic view illustrating the signal frame in accordance with the first embodiment of the present invention.

Referring to FIG. 1 to FIG. 3, a multi-frequency processing device of a tire pressure detector in accordance with the first embodiment comprises an oscillator 10, a microcontroller 20, a phase lock module 30, and a transmission module 40.

The oscillator 10 provides an oscillation signal which is applied as a basis frequency.

The microcontroller 20 is electrically connected with the oscillator 10. The oscillator 10 is allowed to be a signal element separated from the microcontroller 20 or an oscillator component integrated in the microcontroller 20. Therein, the microcontroller 20 stores a first frequency information R1 and a second frequency information R2, wherein the frequency bands of the first frequency information R1 and the second frequency information R2 are different.

The microcontroller 20 is electrically connected with a sense module S which is applied for detecting the air pressure in the air pressure space of the tire of the vehicle and generating a data D corresponding to the air pressure. The microcontroller 20 is configured to receive the data D. Therein, the data D is a pressure signal of the air pressure.

The phase lock module 30 is electrically connected with the oscillator 10 and the microcontroller 20. The phase lock module 30 receives the oscillation signal, and, according to the first frequency information R1 and the second frequency information R2, generates a first target frequency T1 and a second target frequency T2. Therein, the first target frequency T1 is 315 MHz, and the second target frequency T2 is 433 MHz. Notably, in the embodiment, the first target frequency T1 is allowed to be 433 MHz, and the second target frequency T2 is allowed to be 315 MHz. It is noted that the terms "first target frequency T1" and "second target frequency T2" are only applied for separating the two target frequencies, instead of defining the order of the frequencies.

In the embodiment, the phase lock module 30 is a phase lock loop (PLL), comprising a phase frequency comparator 31, a filter 32, and a voltage control oscillator 33. The phase frequency comparator 31 is electrically connected with the oscillator 10 and the filter 32, and the voltage control oscillator 33 is electrically connected with the filter 32. The voltage control oscillator 33 comprises an output end 331 which is electrically connected with the phase frequency comparator 31. Also, when the phase lock module 30 enters a phase lock status, the phase frequency comparator 31 sends a phase lock signal L to the microcontroller 20, so as to know if the target frequency generated by the phase lock module 30 reaches the requirement frequency. Alternatively, if the phase frequency comparator 31 is not used for sending the phase lock signal L to the microcontroller 20, the phase lock module 30 will automatically enter the phase lock status after a period of time (about 50 milliseconds in general).

The transmission module 40 is electrically connected with the microcontroller 20 and the phase lock module 30. Referring to FIG. 1, the microcontroller 20, in a first mode, provides the data D to the transmission module 40, which generates a signal frame F formed of the first target frequency T1 and the second target frequency T2 that carry the data D, and transmits the signal frame F outward. Therein, the transmission module 40 transmits the signal frame F carrying the data D according to the first target frequency T1 or the second target frequency T2. In the embodiment of the present invention, the transmission module 40 comprises an impedance variable antenna 41. The impedance of the impedance variable antenna 41 is adjusted for matching the first target frequency T1 or the second target frequency T2, so as to wirelessly transmit the data D at the first target frequency T1 or the second target frequency T2 outward through the impedance variable antenna 41.

Further, the signal frame F in the embodiment is selectively provided in three operation forms as described in three embodiments; however, the form of the signal frame F of the present invention is not limited to the embodiments herein provided. Referring to FIG. 3, each signal frame F comprises a plurality of unit areas U in the first embodiment. The first target frequency T1 and the second target frequency T2 are alternately disposed in each unit area U. Therein, referring to FIG. 3, each signal frame F comprises six unit areas U, with the formation of the signal frame F being arranged from left side toward the right side in FIG. 3 as the first target frequency T1, the second target frequency T2, the first target frequency T1, the second target frequency T2, the first target frequency T1, and the second target frequency T2. However, the amounts of the unit areas U of each signal frame F is not limited in the present invention.

Figure 4:
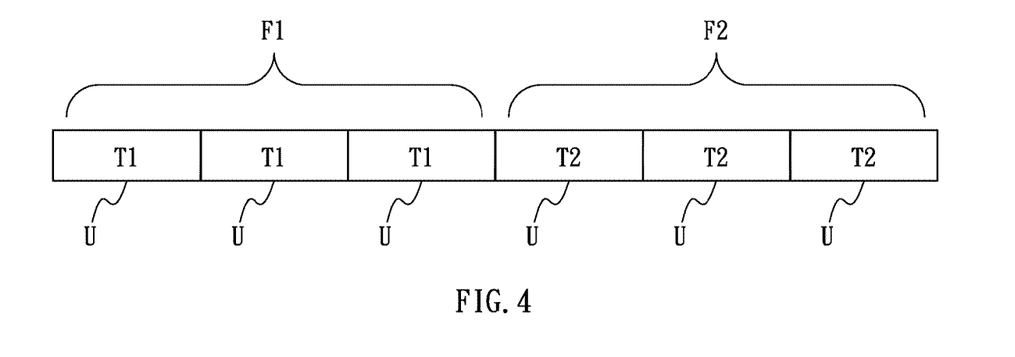
FIG. 4 is schematic view illustrating the signal frame in accordance with the second embodiment of the present invention.

Referring to FIG. 4, the schematic view of the signal frame in accordance with the second embodiment is provided. The signal frame F comprises a first area F1 and a second area F2 that have a plurality of unit areas U, respectively. Each of the unit areas U of the first area F1 is provided with the first target frequency T1, and each of the unit areas U of the second area F2 is provided with the second target frequency T2. As shown by FIG. 4, the first area F1 comprises three unit areas U, and the second area F2 comprises three unit areas U.

Figure 5:
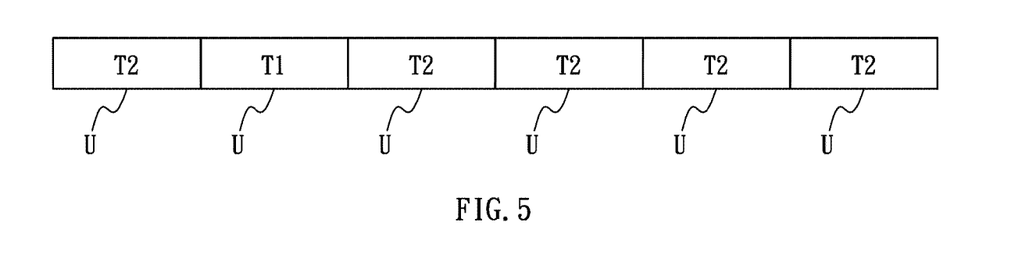
FIG. 5 is a schematic view illustrating the signal frame in accordance with the third embodiment of the present invention.

Referring to FIG. 5, the schematic view of the signal frame in accordance with the third embodiment is provided. The signal frame F comprises a plurality of unit areas U, wherein one of the unit areas U is provided with the first target frequency T1, and the rest of the unit areas U are provided with the second target frequency T2. Notably, in the embodiment, it is allowed to be that one of the unit areas U is provided with the second target frequency T2, with the rest of the unit areas U being provided with the first target frequency T1. It is understood that, one signal frame F is formed with at least one first target frequency T1 and at least one second target frequency T2. As shown by FIG. 5, the signal frame F comprises six unit areas U, while the amount of the unit areas U of each signal frame F is not limited in the present invention.

In addition, referring to FIG. 2, the transmission module 40 sends the signal frame F containing the data D to a terminal device 1. After reading the signal frame F, the terminal device 1 generates a match information M and sends the match information M back to the transmission module 40. The microcontroller 20, in a second mode, acquires the match information M received by the transmission module 40, and, according to the match information M, determines whether the receiving frequency of the terminal device 1 is the first target frequency T1 or the second target frequency T2. Based on the determination, the microcontroller 20 provides the first frequency information R1 or the second frequency information R2 stored in the microcontroller 20 to the phase lock module 30, such that the phase lock module 30 correspondingly generates the first target frequency T1 or the second target frequency T2. Therein, the frequency of the match information M is one of the first target frequency T1 or the second target frequency T2. In the first embodiment of the present invention, the terminal device 1 is a tire pressure surveillance host machine for vehicle.

When the transmission module 40 and the terminal device 1 are confirmed being matched according to the match information M, the present invention is able to conduct transmission with different frequencies under the same frequency band in a manner of frequency hopping transmission, thereby reducing the collision or interference of the signals.

For further illustration, the first frequency information R1 comprises a plurality of first signal values belonging to an identical frequency band, while each of the first signal values represents a unique frequency; the second frequency information R2 comprises a plurality of second signal values belonging to an identical frequency band, while each of the second signal values represents a unique frequency. The microcontroller 20 is applied for selecting the first signal value and the second signal value. In the embodiment, the frequency band of the first frequency information R1 ranges from 315.00 to 315.99 MHz, wherein each first signal value is defined as one of 315.00, 315.01, 315.02 . . . 315.99 MHz; the frequency band of the second frequency information R2 ranges from 433.00 to 433.99 MHz, wherein each first signal value is defined as 433.00, 433.01, 433.02 . . . 433.99 MHz. However, the interval values of the first signal values and the second signal values are not limited by the embodiments herein provided, as long as each first signal value is within the frequency band of the first frequency information R1 and each second signal values is within the frequency band of the second frequency information R2. It is understood that the terms "first" and "second" are only applied for separating the two information and signals from each other, instead of defining the orders of the two objectives. The microcontroller 20 selectively sends the first signal value or the second signal value to the phase lock module 30, such that the phase lock module 30 receives the oscillation signal and, according to the selected first signal value or the second signal value, correspondingly generates the first target frequency T1 or the second target frequency T2.

Therefore, after confirming the receiving frequency of the terminal device 1 through the match information M, the microcontroller 20 sends the first signal value corresponding to the frequency band of the first frequency information R1 or the second signal value corresponding to the frequency band of the second frequency information R2 to the phase lock module 30, and the phase lock module 30, according to the selected first signal value or the second signal value, correspondingly generates the first target frequency T1 or the second target frequency T2.

For example, the terminal device 1 receives the first target frequency T1 carrying the data D, so the match information M indicates that the transmission frequency of the terminal device 1 is the first target frequency T1. When the microcontroller 20 receives the match information M, the microcontroller 20 determines that the terminal device 1 receives the first target frequency T1. Then, before each time of signal transmission, the microcontroller 20 selects one of the first signal values from the frequency band of the first frequency information R1 (such as selecting 315.92 MHz), and sends the selected first signal value to the phase lock module 30. The phase lock module 30 generates the first target frequency T1 (315.92 MHz) according to the selected first signal value, so that the transmission module 40 sends the data D to the terminal device 1 with the first target frequency T1. The first signal value selected for each time is possibly different, and the selection may be carried out in a random manner or a regular circulation.

Figure 6:
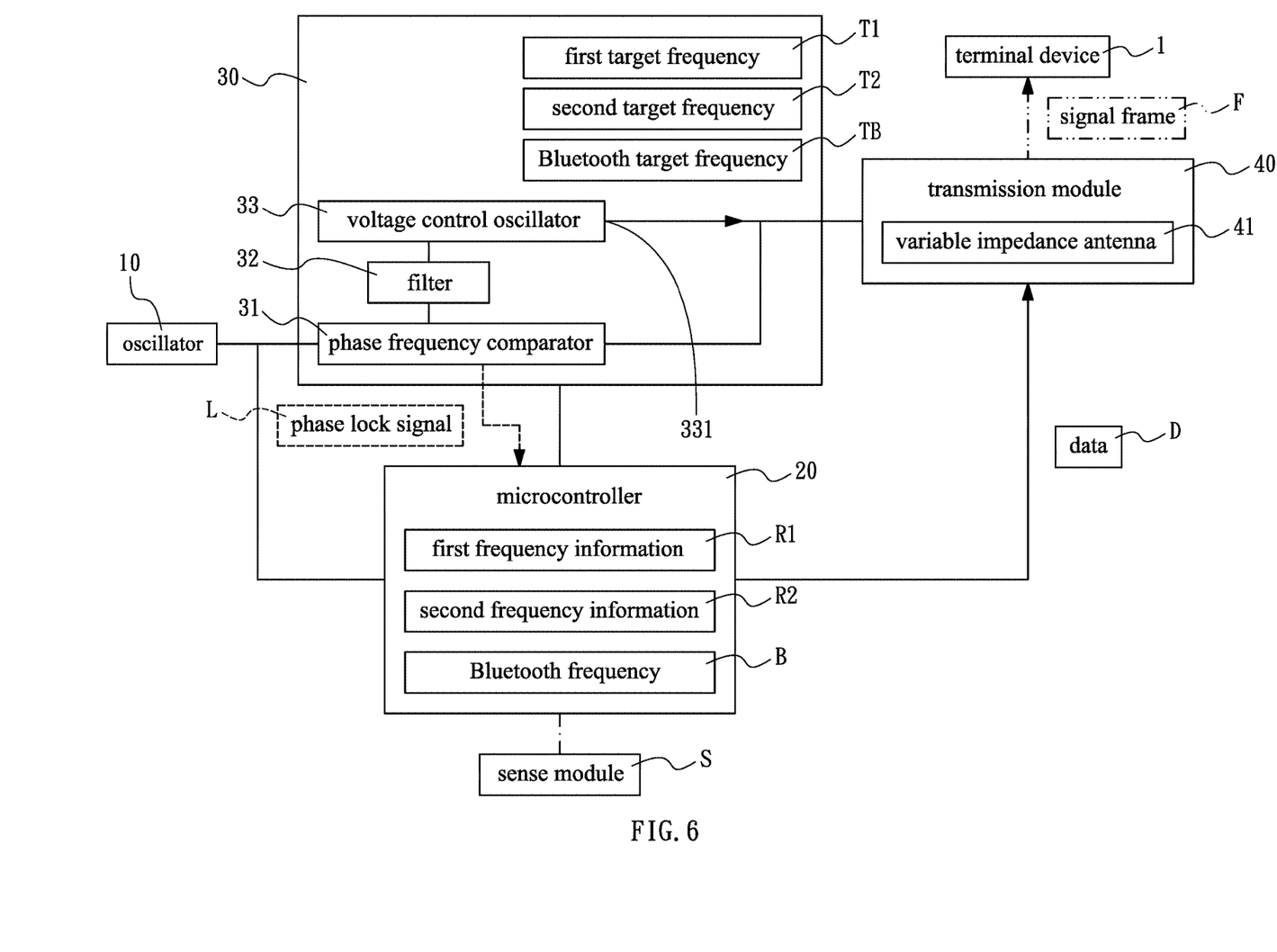
FIG. 6 is a block diagram of a multi-frequency processing device in accordance with the second embodiment of the present invention.

Referring to FIG. 6, a multi-frequency processing device of a tire pressure detector in accordance with the second embodiment of the present invention is provided, which further comprises following features.

The microcontroller 20 stores a Bluetooth frequency B, and is able to send the Bluetooth frequency B to the phase lock module 30. The phase lock module 30 is able to receive the oscillation signal and generate a Bluetooth target frequency TB according to the Bluetooth frequency B. Therein, when the microcontroller 20 is in the first mode and provides the data D to the transmission module 40, the transmission module 40 is able to send out the data D according to the Bluetooth target frequency TB, such that the terminal device 1 receives the Bluetooth target frequency TB carrying the data D. In the second embodiment, the terminal device 1 is an intelligent mobile device or a central control monitor having the Bluetooth transmission function, so that the terminal device 1 is signally connected with the transmission module 40 through the Bluetooth transmission function for receiving and displaying the data D.

Figure 7:
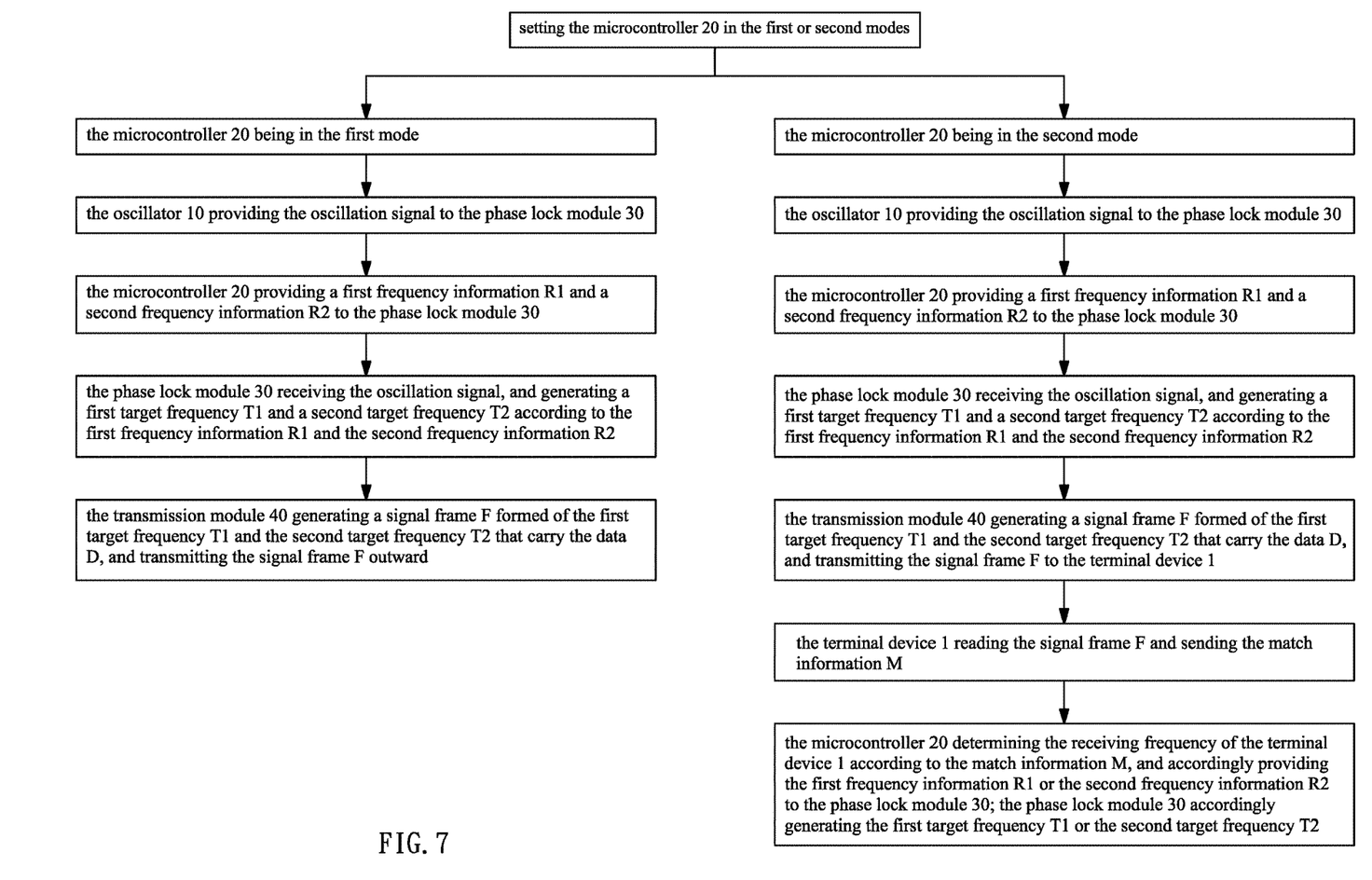
FIG. 7 is a flow chart of the multi-frequency processing method in accordance with the first embodiment of the present invention.

Referring to FIG. 1, FIG. 2, and FIG. 7, with the multi-frequency processing device of the aforementioned first embodiment, a multi-frequency processing device of a tire pressure detector is provided, comprising following steps.

First, the microcontroller 20 is set between a first mode and a second mode. Therein, when the data D is to be transmitted outward and the receiving frequency of the terminal device 1 is unknown, the microcontroller 20 is set in the first mode, as shown by the flow on the left side of FIG. 7. When the microcontroller 20 needs to automatically confirm the receiving frequency of the terminal device 1 and carry out a learning process, the microcontroller 20 is set in the second mode, as shown by the flow on the right side of FIG. 7.

For further explanation, when the microcontroller 20 is set in the first mode, the oscillator 10 provides an oscillation signal which is applied as the basis frequency by the phase lock module 30.

Next, the microcontroller 20 sends the first frequency information R1 and the second frequency information R2 to the phase lock module 30. Meanwhile, the phase lock module 30 receives the oscillation signal generated by the oscillator 10, and generates the corresponding first target frequency T1 and second target frequency T2 according to the first frequency information R1 and the second frequency information R2 provided by the microcontroller 20.

Next, the phase lock module 30 sends the generated first target frequency T1 and second target frequency T2 to the transmission module 40, and the microcontroller 20 sends the data D provided by the sense module S to the transmission module 40.

Then, the transmission module 40 forms the signal frame F with the first target frequency T1 and the second target frequency T2 that carry the data D, and sends the signal frame F to the terminal device 1, whereby the terminal device 1 receives the first target frequency T1 or the second target frequency T2 that carry the data D.

When the microcontroller 20 is set in the second mode, the microcontroller 20 receives the match information M sent by through the transmission module 40, so as to determine whether the receiving frequency of the terminal device 1 is the first target frequency T1 or the second target frequency T2 according to the match information M.

When the transmission module 40 and the terminal device 1 are confirmed to be matched through the match information M, the present invention is able to transmit with different frequencies under the same frequency band in a manner of frequency hopping transmission, thereby reducing the signal collisions or interference. Thus, after confirming the receiving transmission of the terminal device 1, the microcontroller 20 selectively sends the first signal value corresponding to the frequency band of the first frequency information R1 or the second signal value corresponding to the frequency band of the second frequency information R2 to the phase lock module 30, whereby the phase lock module 30 generates the first target frequency T1 corresponding to the first signal value or the second target frequency T2 corresponding to the second signal value.

Figure 8:
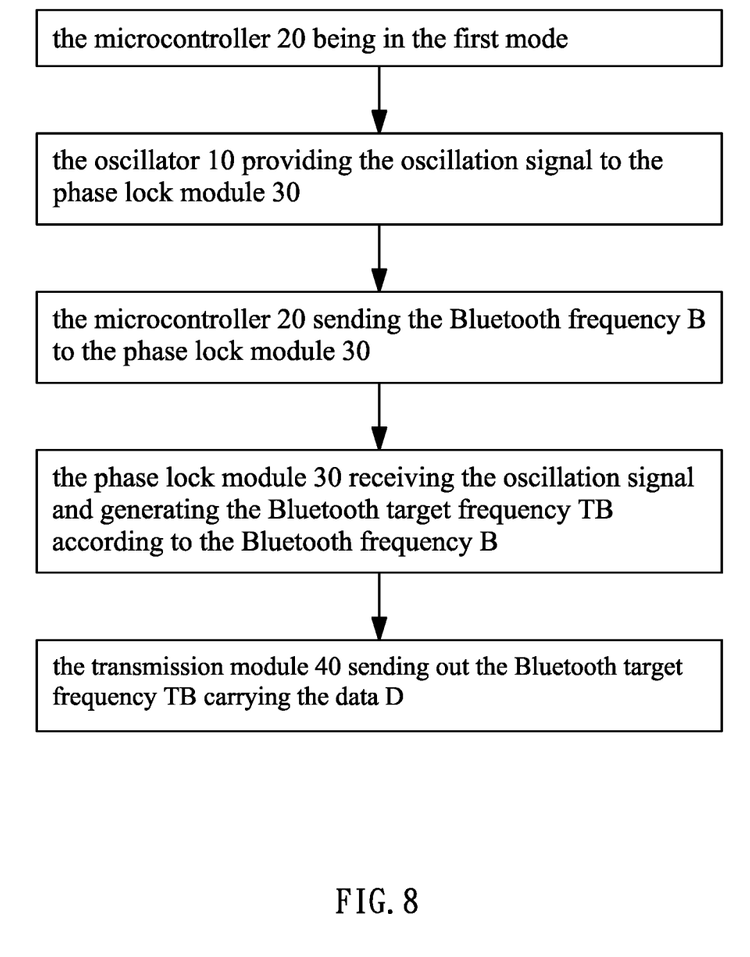
FIG. 8 is a flow chart of the multi-frequency processing method in accordance with the second embodiment of the present invention.

Referring to FIG. 6 and FIG. 8, with the multi-frequency processing device in accordance with the second embodiment, a multi-frequency processing method of a tire pressure detector in accordance with the second embodiment of the present invention is provided, further comprising following steps.

When the microcontroller 20 is set in the first mode, the oscillator 10 provides the oscillation signal which is applied as the basis frequency by the phase lock module 30.

Next, the microcontroller 20 sends the Bluetooth frequency B to the phase lock module 30. Meanwhile, the phase lock module 30 receives the oscillation signal generated by the oscillator 10, and correspondingly generates the Bluetooth target frequency TB according to the Bluetooth frequency B provided by the microcontroller 20.

Then, the transmission module 40 sends the Bluetooth target frequency TB carrying the data D outward to the terminal device 1, so that the terminal device 1 receives the Bluetooth target frequency TB carrying the data D.

With the foregoing configuration, the present invention achieves following effects.

The present invention forms the signal frame F with the first target frequency T1 and the second target frequency T2 that carry the data D, and sends the signal frame F outward. Therefore, it is not necessary to set the receiving frequency of the terminal device 1 in advance, facilitating the convenience of the installation of the tire pressure detector.

According to the match information M sent after the terminal device 1 reading the signal frame F, the microcontroller 20, according to the match information M, determines whether the receiving frequency of the terminal device 1 is the first target frequency T1 or the second target frequency T2, after which the data transmission is to be carried out with the receiving frequency of the terminal device 1. Therefore, it is not necessary to set the transmission frequency according to the receiving frequency of the terminal device 1 in advance, thus saving the process of setting the target frequency of the tire pressure detector and facilitating the convenience of installation thereof.

The present invention is able to conduct the transmission of the first signal value or the second signal value that carry the data D with different frequencies under the same corresponding frequency band, so as to reduce the signal collision or interference in a manner of frequency hopping transmission.

In addition to send the first target frequency T1 and the second target frequency T2 carrying the data D to the tire pressure surveillance host machine for vehicle, the present invention is able to send the Bluetooth target frequency TB carrying the data D to the intelligent mobile device or a central control monitor having the Bluetooth transmission function, thus improving the utility and broadening the usage scope of the present invention.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A multi-frequency processing device of a tire pressure detector, comprising:
   an oscillator being configured to provide an oscillation signal which is applied as a basis frequency;
   a microcontroller electrically connected with the oscillator;
   a phase lock module electrically connected with the oscillator and the microcontroller, the phase lock module being configured to receive the oscillation signal, and generate a first target frequency and a second target frequency; and
   a transmission module electrically connected with the microcontroller and the phase lock module, the microcontroller being configured to provide a data to the transmission module in a first mode and generate a signal frame which is formed of the first target frequency and second target frequency that carry the data, the transmission module sending the signal frame containing the data to a terminal device, the terminal device sending a match information after reading the signal frame, and the microcontroller receiving the match information sent by the transmission module in a second mode to determine a receiving frequency of the terminal device.

2. The multi-frequency processing device of claim 1, wherein the microcontroller determines whether a receiving frequency of the terminal device is the first target frequency or the second target frequency according to the match information.

3. The multi-frequency processing device of claim 2, wherein a transmission frequency of the match information is one of the first target frequency and the second target frequency.

4. The multi-frequency processing device of claim 1, wherein the microcontroller stores a first frequency information and a second frequency information; a frequency band of the first frequency information and a frequency band of the second frequency information are different; the first frequency information comprises a plurality of first signal values that belong to an identical frequency band, and each of the first signal values represents a unique frequency; the second frequency information comprises a plurality of second signal values that belong to an identical frequency band, and each of the second signal values represents a unique frequency; the microcontroller selectively sends the first signal values or the second signal value to the phase lock module, so that the phase lock module receives the oscillation signal and correspondingly generates the first target frequency according to one of the selected first signal values or generates the second target frequency according to one of the selected second signal values.

5. The multi-frequency processing device of claim 2, wherein the microcontroller stores a first frequency information and a second frequency information; a frequency band of the first frequency information and a frequency band of the second frequency information are different; the first frequency information comprises a plurality of first signal values that belong to an identical frequency band, and each of the first signal values represents a unique frequency; the second frequency information comprises a plurality of second signal values that belong to an identical frequency band, and each of the second signal values represents a unique frequency; the microcontroller receives the match information, so as to confirm the receiving frequency of the terminal device; the microcontroller selectively sends the first signal value or the second signal value to the phase lock module, so that the phase lock module correspondingly generates the first target frequency according to one of the selected first signal values or generates the second target frequency according to one of the selected second signal values.

6. The multi-frequency processing device of claim 1, wherein the microcontroller stores a Bluetooth frequency, and the phase lock module generates a Bluetooth target frequency according to the Bluetooth frequency; the microcontroller provides the data to the transmission module in the first mode, and the transmission module transmits the data according to the Bluetooth target frequency.

7. The multi-frequency processing device of claim 1, wherein the signal frame comprises a plurality of unit areas; the first target frequency and the second target frequency are alternately disposed in each unit area.

8. The multi-frequency processing device of claim 1, wherein the signal frame comprises a first area and a second area that have a plurality of unit areas, respectively; each unit area of the first area is provided with the first target frequency, and each unit area of the second area is provided with the second target frequency.

9. The multi-frequency processing device of claim 1, wherein the signal frame comprises a plurality of unit areas, wherein one of the unit areas is provided with the first target frequency, with the rest of the unit areas provided with the second target frequency.

10. A multi-frequency processing method of a tire pressure detector, comprising following steps:
an oscillator providing an oscillation signal which is applied as a basis frequency by a phase lock module;
the phase lock module receiving the oscillation signal, and generating a first target frequency and a second target frequency;
the phase lock module sending the first target frequency and the second target frequency to a transmission module;
a microcontroller providing a data to the transmission module in a first mode; the transmission module generating a signal frame which is formed of the first target frequency and the second target frequency that carry the data;
the transmission module sending the signal frame containing the data to a terminal device, and the terminal device sending a match information after reading the signal frame; and
the microcontroller receiving the match information sent by the transmission module in a second mode to determine a receiving frequency of the terminal device.

11. The multi-frequency processing method of claim 10, wherein
the microcontroller, determines whether a receiving frequency of the terminal device is the first target frequency or the second target frequency; and
the transmission module transmits the first target frequency or the second target frequency carrying the data outward.

12. The multi-frequency processing method of claim 10, wherein the microcontroller provides a first frequency information and a second frequency information; a frequency band of the first frequency information and a frequency band of the second frequency information are different; the first frequency information comprises a plurality of first signal values that belong to an identical frequency band, and each of the first signal values represents a unique frequency; the second frequency information comprises a plurality of second signal values that belong to an identical frequency band, and each of the second signal values represents a unique frequency; the microcontroller selects and sends one of the first signal values and one of the second signal values to the phase lock module, so that the phase lock module receives the oscillation signal and correspondingly generates the first target frequency according to one of the selected first signal values or generates the second target frequency according to one of the selected second signal values.

13. The multi-frequency processing method of claim 11, wherein the microcontroller provides a first frequency information and a second frequency information; a frequency band of the first frequency information and a frequency band of the second frequency information are different; the first frequency information comprises a plurality of first signal values that belong to an identical frequency band, and each of the first signal values represents a unique frequency; the second frequency information comprises a plurality of second signal values that belong to an identical frequency band, and each of the second signal values represents a unique frequency; the microcontroller receives the match information, so as to confirm the receiving frequency of the terminal device; the microcontroller selectively sends the first signal values or the second signal value to the phase lock module, so that the phase lock module correspondingly generates the first target frequency according to one of the selected first signal values or generates the second target frequency according to one of the selected second signal values.

14. The multi-frequency processing method of claim 10, wherein the phase lock module generates a Bluetooth target frequency according to a Bluetooth frequency provided by the microcontroller; when the microcontroller is in the first mode, the microcontroller provides the data to the transmission module, and the transmission module transmits the data outward according to the Bluetooth target frequency.

\* \* \* \* \*